United States Patent [19]

Miura et al.

[11] 4,369,608
[45] Jan. 25, 1983

[54] PANEL FOR AUTOMOBILE

[75] Inventors: Toshikatsu Miura, Higashikurume; Hiroto Kikuchi, Hiratsuka; Yukio Okada, Kodaira; Tsutomu Yoshioka, Tokyo, all of Japan

[73] Assignee: Nissan Motor Company, Limited, Yokohama, Japan

[21] Appl. No.: 183,691

[22] Filed: Sep. 3, 1980

[30] Foreign Application Priority Data

Sep. 8, 1979 [JP] Japan .................. 54-114731

[51] Int. Cl.³ .................... B32B 7/08; B60R 13/04
[52] U.S. Cl. .................... 52/309.9; 52/716; 293/1; 296/146
[58] Field of Search .......... 52/309.4–309.17, 52/716, 741, 738, 743; 296/146; 293/1, 109; 428/31, 463

[56] References Cited

U.S. PATENT DOCUMENTS

| 3,638,992 | 2/1972 | Forshee | 52/309.9 X |
|---|---|---|---|
| 3,855,028 | 12/1974 | Larson | 52/309.5 X |
| 3,868,796 | 3/1975 | Bush | 52/309.9 X |
| 3,914,482 | 10/1975 | Sawa et al. | 52/716 X |
| 3,938,288 | 2/1976 | Roubinet | 52/309.4 X |

FOREIGN PATENT DOCUMENTS

| 1281867 | 3/1963 | Fed. Rep. of Germany . |
|---|---|---|
| 1784165 | 7/1971 | Fed. Rep. of Germany . |
| 2558332 | 7/1977 | Fed. Rep. of Germany . |
| 1393315 | 12/1962 | France . |
| 2277702 | 2/1976 | France . |
| 2279603 | 2/1976 | France . |
| 2429667 | 1/1980 | France . |
| 936343 | 9/1963 | United Kingdom . |
| 1391780 | 4/1975 | United Kingdom . |
| 555954 | 11/1974 | Switzerland ............... 52/309.9 |

Primary Examiner—J. Karl Bell
Attorney, Agent, or Firm—Thompson, Birch, Gauthier & Samuels

[57] ABSTRACT

A panel for an automotive vehicle and the method of making same. A main reinforcing member is bonded to an outer panel, the reinforcing member being made of a hardened thermosetting material. An auxiliary reinforcing member is attached to and covers the entire inner side of the main reinforcing member. A core element of foamed resin is encapsulated between the outer panel and the main reinforcing member and causes the latter to bulge in the inward direction to form a rib-like projection to strengthen the panel.

4 Claims, 8 Drawing Figures

FIG.1A (PRIOR ART)   FIG.1B (PRIOR ART)   FIG.1C (PRIOR ART)
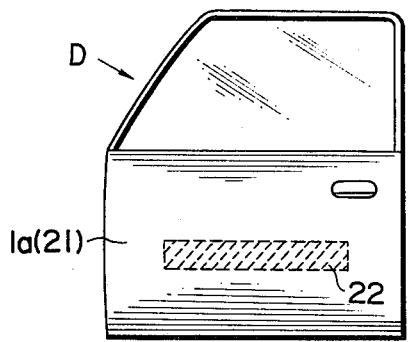
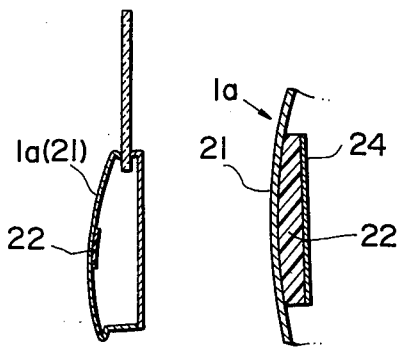
FIG.2A   FIG.2B
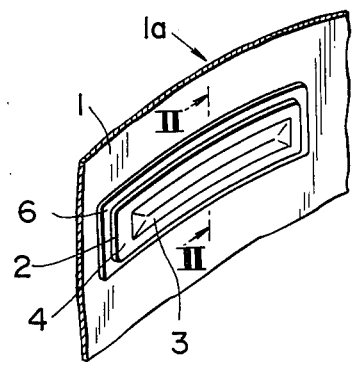
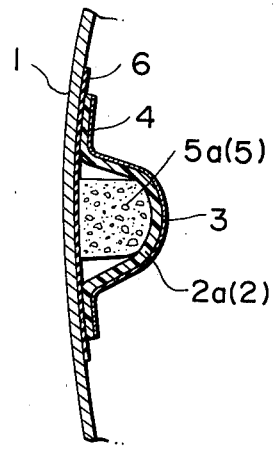

PANEL FOR AUTOMOBILE

BACKGROUND OF THE INVENTION

1. Field of the Invention

This invention relates to an improved panel for an automotive vehicle, for example, such as a door panel or a roof panel and a method of making it.

2. Description of the Prior Art

In a conventional door for an automotive vehicle, a thermosetting resin reinforcing member is usually bonded to the inner side of an outer metal panel of the door to improve the strength and rigidity thereof. FIGS. 1A, 1B, and 1C show such a prior art door panel. An outer panel 1a of a door D comprises a metal panel 21 on the inner surface of which a thermosetting resin reinforcing member 22 is bonded. A glass fiber woven cloth reinforcing member 24 is attached to the thermosetting resin reinforcing member 22 as best shown in FIG. 1C. The thermosetting resin reinforcing member 22 is formed in a desired shape by applying heat thereto when the reinforcing member 22 is secured to the metal panel 21.

In another prior art door, a thermosetting resin reinforcing member is first formed in the shape of the subject panel, and thereafter is bonded to the panel by an adhesive material.

In such prior art panels for automobiles, even if a starting material has good strength and rigidity for use in the reinforcing member 22, the reinforcing member must be reasonably thick in order to obtain the desired strength. Thus, the quantity of the starting material to be used increases, the production cost thereof increases, and the weight of the door utilizing such a reinforcing material increases, also. In addition, when the reinforcing member made of a thermosetting resin is formed into the desired shape before it is adhesively bonded to the door panel, it is difficult to form the reinforcing member precise in the shape corresponding to that of the door panel.

SUMMARY OF THE INVENTION

According to the present invention, an automobile panel includes a sheet-like main reinforcing member and a wave-like or bead-like projection formed thereon which functions as a rib of the panel. The panel is made of a metal, for example, steel. The main reinforcing member is preferably made of a thermosetting resin. It is preferable that a rust-proofing film be provided on a portion of the panel to be reinforced. Also, a sheet-like auxiliary reinforcing member is preferably bonded to the main reinforcing member in a multi-layer fashion. Such an auxiliary reinforcing member can be made of a glass fiber, carbon fiber, polyester woven cloth, polypropylene woven cloth, kraft paper or the like. According to the present invention, also, a method for making such a panel for an automobile is provided.

It is an object of the present invention to provide a panel for an automotive vehicle having improved strength and rigidity.

A further object of the present invention is to provide a panel for an automobile in which relatively thin sheet metal is used.

Still another object of the present invention is to provide a method for making such a panel for an automobile.

BRIEF DESCRIPTION OF THE DRAWINGS

These and other objects, features and advantages of the present invention will become apparent from the following detailed description of preferred embodiments thereof when read in conjunction with the accompanying drawings in which:

FIG. 1A is a front view showing a door having a prior art panel for an automobile;

FIG. 1B shows a vertical section of the door shown in FIG. 1A with some parts omitted for the purpose of clarity;

FIG. 1C is an enlarged sectional view showing a portion of the door shown in FIG. 1B;

FIG. 2A is a perspective view showing a portion of an outer panel of an automobile door according to a first embodiment of the present invention;

FIG. 2B is a sectional view taken along line II—II in FIG. 2A;

DETAILED DESCRIPTION OF THE PREFERRED EMBODIMENTS

Figure 3:
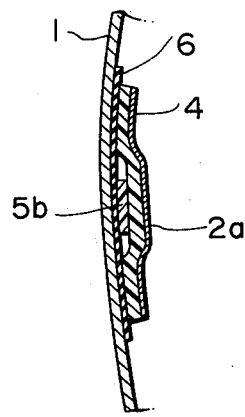
FIG. 3 is a sectional view useful for explaining a method of making a panel for an automotive vehicle according to the present invention.

FIGS. 2A and 2B show a first embodiment of the present invention. An outer panel 1a of an automobile door comprises a panel member 1. A sheet-like member or film 6 made of a water-proof rubber is attached to a portion of the panel member 1 to be reinforced, thereby to obtain an anti-corrosive or rust-proof condition on a desired area of the panel member 1. A sheet-like main reinforcing member 2 is fixedly attached to the film 6. An auxiliary reinforcing member 4 is additionally bonded to the main reinforcing member 2. The auxiliary reinforcing member 4 may be made of a glass fiber woven cloth. The main reinforcing member 2 may be made of a thermosetting resin such as an epoxy resin. The center portion of the main reinforcing member 2 is designed to bulge out along most of its longitudinal length to form a bead-like or wave-like projection 3. This gives reinforcing member 2 a hat-like cross-section.

A core 5 is placed in the wave-like projection 3 of the main reinforcing member 2 and is made of a foamed resin such as a foamed polyethylene. It is preferable that the core 5 be sealed within the main reinforcing member 2. The core 5 comprises an initially compressed, non-foam material 5a that foams to expand, as shown in FIG. 2B, when heated sufficiently. The reinforcing material 2a is initially pliable, yet resistant to permanent tensile deformation, during the heating process so that the core material 5a may easily expand, to form the wave-like projection 3. As shown in FIG. 2A, the reinforcing member 2 and the auxiliary reinforcing member 4 are preferably bonded to the panel 1, or to the film 6, to totally surround and enclose the core material 5a so that the structural reinforcement is two-dimensional, as opposed to being only one-dimensional, when the ends of the wave-like projection 3 are left open. Thereafter, they are hardened so that the wave-like projection 3 of the main reinforcing member 2 functions as a rib of the panel member 1.

Those skilled in the art will readily appreciate that as the core material 5 expands, it produces a tensile force in the rounded or wave-like projection 3 which acts through the portions of the main and auxiliary reinforcing members 2 and 4 that are bonded to the panel 1 to impart a bending stress to the panel. This bending stress increases the structural rigidity of the panel 1 without the addition of an excessive amount of weight thereto.

A method of making such a door panel for an automobile will now be stated in detail as follows:

First, the water-proof rubber film 6 is attached to a portion of the panel material 1 to be reinforced. As shown in FIG. 3, a strip-like starting material 5b which can be foamed when heated is bonded to the film 6. Also, the auxiliary reinforcing glass fiber woven cloth member 4 is attached to the film 6 to cover the strip-like starting material 5b. The sheet-shaped starting material 2a for the thermosetting resin reinforcing member 2 is bonded to the auxiliary reinforcing glass fiber woven cloth member 4 in a multi-layer fashion. The starting material 2a is still pliable and adhesive at room temperature. One good example of the reinforcing starting material 2a is a sheet-like epoxy resin which is not yet hardened.

In order for the strip-like starting material 5b to be sealed by the reinforcing starting material 2a, the periphery or edge of the reinforcing starting material 2a is bonded with the auxiliary reinforcing member 4 to the panel member 1 under pressure so that they can be perfectly bonded to each other. Thereafter, the panel member 1 is heated at a temperature of 120° C. to 180° C., for example, within a coating dry furnace. During such heating step, the strip-like starting material 2a is softened, and thereafter the reinforcing starting material 5b begins to foam. The finally foamed resin 5a, as shown in FIG. 2B, is approximately ten times the volume of the strip-like starting material 5b. As a result, the reinforcing starting material 2a is pressed outwardly or expanded by the foaming of the starting material 5b so that a wave-like projection or projections are formed in the longitudinal direction along the reinforcing starting material. When heated to its thermosetting temperature, the strip-like starting material 2a is hardened as it is. Consequently, improved strength and rigidity of the panel member 1 is obtained by the combination of the main and auxiliary reinforcing members 2, 4. The wave-like projection 3 of the main reinforcing member 2 functions as a rib of the panel member 1 to improve its rigidity and strength.

Figure 4A:
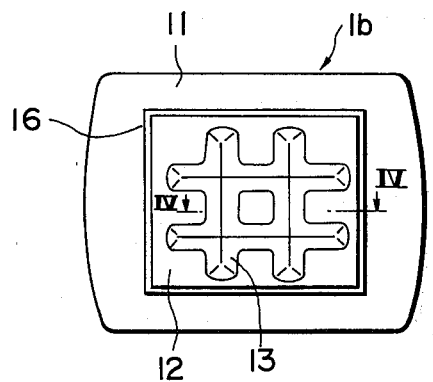
FIG. 4A is a view showing a portion of a roof panel for an automobile according to a second embodiment of the present invention.
Figure 4B:
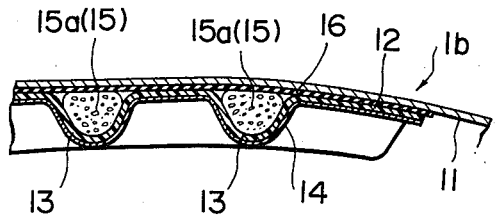
FIG. 4B is a sectional view taken along line IV—IV in FIG. 4A.

FIGS. 4A and 4B illustrate a second embodiment of the present invention. An automobile roof panel 1b has a larger surface area than the door outer panel 1a. Therefore, another type or pattern of wave-like projection 13 is formed on the roof panel 1b to increase its strength and rigidity. For example, a lattice-like projection 13 is preferred. Such a roof panel 1b is formed with a wave-like projection 13 substantially in the same manner as in the first embodiment.

Also, the roof panel 1b with the lattice-shaped pattern wave-like projection 13 may be produced by any other method. For example, a lattice-shaped core 15 of the foamed resin 15a is bonded on the water-proof rubber film 16 which is fixed on a portion of the panel member 11 to be reinforced. Further, a reinforcing starting material 12a which is not yet hardened is attached to the film 16 and the core 15 to cover the core. Thereafter, the panel member 11 is heated at a predetermined temperature. During such a heating period, the reinforcing starting material 12a hardens to thereby become the main reinforcing member 12 having the wave-like projection 13. Therefore, the wave-like projection 13 is prevented from deforming during the thermosetting period of the starting material 12a. As in the preferred embodiment, the reinforcing member 12 and auxiliary reinforcing member 14 are preferably bonded to the panel 11 or to the film 16 to totally surround and enclose the core material 15, or the ends of the wave-like projection 13 may be open so that it is not sealed.

This invention may be practiced or embodied in still other ways without departing from the spirit or essential character thereof. For instance, while in the illustrated preferred embodiments, the starting materials 2a, 12a of the reinforcing members 2, 12 are made of an epoxy resin, the present invention is not limited to such a resin. The starting material 2a, 12a may be made of any resin including melamine resin, phenol resin or urea resin if it is resilient and adhesive at room temperature and can be hardened during a coating bake step of the vehicle body at a predetermined temperature of 120° C. to 180° C. The auxiliary reinforcing member 4, 14 can be made of not only glass fiber woven cloth but also a glass fiber, carbon fiber, polyester woven cloth, polypropylene woven cloth, kraft paper or the like. While in the illustrated embodiments, the auxiliary reinforcing member 4, 14 is attached to the outer surface of the main reinforcing member 2, 12, it can be attached to the inner surface thereof or to both sides thereof.

The core 5, 15 may be made of not only the foamed resin 5a, 15a but also of any other material if it has a desired thermal stability at a coating bake temperature of 120° C. to 180° C. and is light in weight.

The starting material 5b can be made of not only a foaming polyethylene sheet but also of any other material if it can be foamed prior to the thermosetting of the starting reinforcing material 2a during a coating bake period and has a desired volume expansion coefficient. An example is foaming epoxy resin. Also, the starting material 5b may be foamed to become a softened resin such as a foamed polyethylene sheet as well as a hardened foamed resin.

The foamed resin 15a in the above-stated second embodiment may be a foamed resin having separate bulbs therein. In addition, the wave-like projection 3, 13 can be formed in shapes other than a straight line or lattice.

The film 6, 16 can be any material if it has water-proofing and rust-proofing characteristics with respect to the panel 1 or 11 and has thermal stability at a coating bake temperature of 120° C. to 180° C., and can be bonded to both the panel 1, 11 and the main reinforcing member 2, 12. For example, the film 6, 16 can be paint coated on the panel for the purpose of rust-proofing.

In addition, a method of producing a panel according to the present invention is not limited to the illustrated embodiments. For instance, a paint is previously coated on the panel 1, 11 and naturally dried. Thereafter, the starting material for reinforcing and the starting material to be foamed are combined. The starting material to be foamed is heated at a coating bake stage to be foamed, for example, within a coating dry furnace. As a result, it deforms the reinforcing material which is already softened by the heat so that a wave-like projection may be formed. When the reinforcing material is further heated, it hardens and, at the same time, the paint coating between the panel and the foamed resin and between the panel and the reinforcing material is completely dried.

If a stainless steel or aluminum panel is used, which needs no rust-proofing, it can be directly bonded to the panel without coating.

As can be seen from the foregoing, according to the present invention, a wave-shaped projection of a main reinforcing member can function as a rib of a panel for an automobile to increase remarkably the strength and rigidity thereof whereby the reinforcing member can be thin so that the quantity of the reinforcing starting material is small in volume and the production cost thereof is decreased.

A reinforcing material which is resilient and adhesive at room temperature is bonded to the panel. Therefore, the contact between the reinforcing member and the panel can be easily perfected.

As the starting material is foamed for the purpose of forming a wave-like projection before the main reinforcing material is heated to be hardened, a desired type or pattern of wave-like projection or projections can be certainly and easily formed. Also, if they are heated during a coating bake period, then production can be simplified.

The present invention can be applied to a door panel or roof panel of an automotive vehicle as well as to a front fender, rear fender or other structural parts for the purpose of reinforcing them.

What is claimed is:

1. A panel for an automotive vehicle comprising:
   an outer panel of the vehicle;
   a rust-proofing film bonded to the inner side of said outer panel;
   a main reinforcing member bonded at its periphery to the inner side of said film, said main reinforcing member being made of a hardened thermosetting resin;
   an auxiliary reinforcing member bonded to and covering the entire inner side of said main reinforcing member; and
   a core element completely encapsulated between the inner side of said film and the outer side of said main reinforcing member, said core element being made of a foamed resin material that is heat-expanded to cause said main reinforcing member and said auxiliary reinforcing member to bulge inwardly to form a rib-like projection to strengthen the panel.

2. A panel for an automotive vehicle comprising:
   an outer panel of the vehicle;
   a main reinforcing member bonded at its periphery to the inner side of said outer panel, said main reinforcing member being made of a hardened thermosetting resin;
   an auxiliary reinforcing member bonded to and covering the entire inner side of said main reinforcing member; and
   a core element completely encapsulated between the inner side of said outer panel and the outer side of said main reinforcing member, said core element being made of a foamed resin material that has heat-expanded to cause said main reinforcing member and said auxiliary reinforcing member to bulge inwardly to form a rib-like projection to strengthen the panel.

3. A method of reinforcing a panel for an automotive vehicle comprising the following steps:
   bonding a rust-proofing film to the inner side of an outer panel of the vehicle;
   bonding an initially strip-like core element to the inner side of said film, said core element being made of a resin which foams and expands at a predetermined foaming temperature;
   bonding a sheet-like main reinforcing member to the inner side of said film to completely encapsulate said core element therebetween, said main reinforcing member being made of a resin which is resilient and adhesive at room temperature and which hardens at a predetermined hardening temperature which is higher than the foaming temperature of said core element;
   thereafter heating said core element and said main reinforcing member to the foaming temperature to cause said core element to foam and expand causing said main reinforcing member to bulge inwardly to form a rib-like projection to strengthen the panel; and
   thereafter additionally heating said main reinforcing member to the hardening temperature to harden the rib-like projection.

4. The method of claim 3 further comprising the following steps:
   before heating said core element, bonding a sheet-like auxiliary reinforcing member over the entire inner side of said main reinforcing member, said auxiliary reinforcing member being made of glass fibers.

* * * * *